(12) United States Patent
Braam et al.

(10) Patent No.: US 6,290,275 B1
(45) Date of Patent: Sep. 18, 2001

(54) ROBOTICALLY DRIVABLE INTERFACE MECHANISM

(75) Inventors: Bernardus Carolus Braam; Jan Hopman, both of Delft (NL)

(73) Assignee: Nederlandse Organisatie Voor Toegepast-Natuurwetenschappelijk Onderzoek TNO, Delft (NL)

(*) Notice: Subject to any disclaimer, the term of this patent is extended or adjusted under 35 U.S.C. 154(b) by 0 days.

(21) Appl. No.: 09/357,154

(22) Filed: Jul. 19, 1999

(30) Foreign Application Priority Data

Jul. 17, 1998 (EP) .................................................. 98202427

(51) Int. Cl.⁷ ............................... B25J 15/04; B64G 1/64
(52) U.S. Cl. ...................... 294/86.4; 244/161; 414/729; 901/30
(58) Field of Search ............................ 294/1.1, 2, 65.5, 294/66.1, 81.1, 81.53, 86.4, 86.41, 93, 103.1, 119.1; 244/158 R, 161; 403/13; 414/680, 723, 729, 739–741; 901/30, 31, 39, 50

(56) References Cited

U.S. PATENT DOCUMENTS

| 4,664,588 | 5/1987 | Newell et al. ................. 294/86.4 X |
| 4,897,014 | 1/1990 | Tietze ............................... 294/86.4 X |
| 5,044,063 | 9/1991 | Voellmer ........................ 294/86.4 X |
| 5,046,691 | 9/1991 | Hart . | |
| 5,120,101 | 6/1992 | Vranish ............................... 901/39 X |
| 5,125,601 | 6/1992 | Monford .............................. 244/161 |
| 5,167,464 | 12/1992 | Voellmer . | |
| 5,219,318 | 6/1993 | Vranish ............................... 901/30 X |
| 5,244,406 | 9/1993 | Vranish . | |
| 5,597,283 | 1/1997 | Jones .................................... 414/723 |

FOREIGN PATENT DOCUMENTS 2-036028   2/1990   (JP) .

OTHER PUBLICATIONS

Braam et al , "End Effector for on–orbit servicing of Payloads", *Proceedings Sixth European Space Mechanics & Tribology Symposium*, Zurich, Switzerland, Oct. 4–6, 1995, pp. 325–329.

Braam et al., "Payload Interfaces for External Robotic Servicing (Piers)"; final report, *TNO Institute of Applied Physics*, Delft, The Netherlands, Apr. 1995, pp. 10, 13, 16,17, 24, 33, 38 and 43.

Primary Examiner—Johnny D. Cherry
(74) Attorney, Agent, or Firm—Young & Thompson

(57) ABSTRACT

Robotically drivable interface mechanism for coupling to a device and for coupling to an end effector attachable to the end of a robot arm. The interface mechanism having a first coupler to couple with an associated second coupler on the device and a third coupler to couple with an associate fourth coupler on the end effector. The first coupler is connectable to an actuator included in the end effector, when the interface mechanism is coupled to the end effector. The first coupler has at least one first roller for cooperating with the second coupler formed by at least one slot in the device.

17 Claims, 4 Drawing Sheets

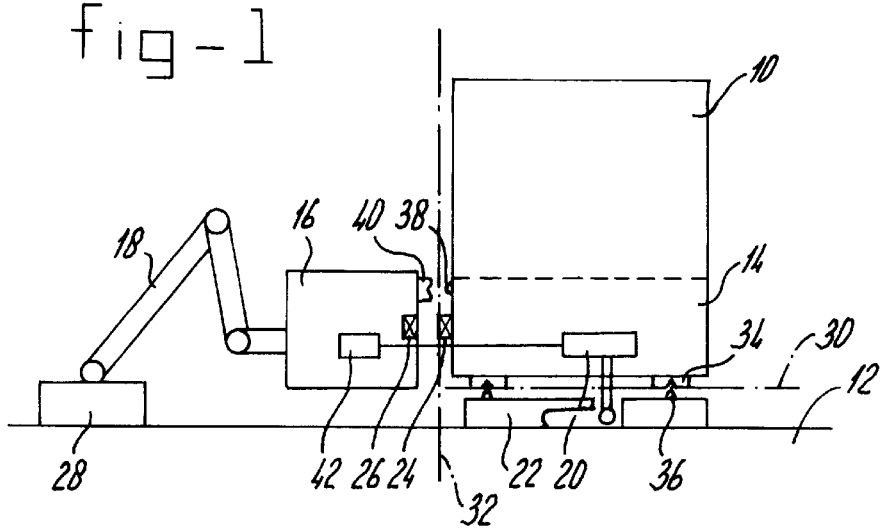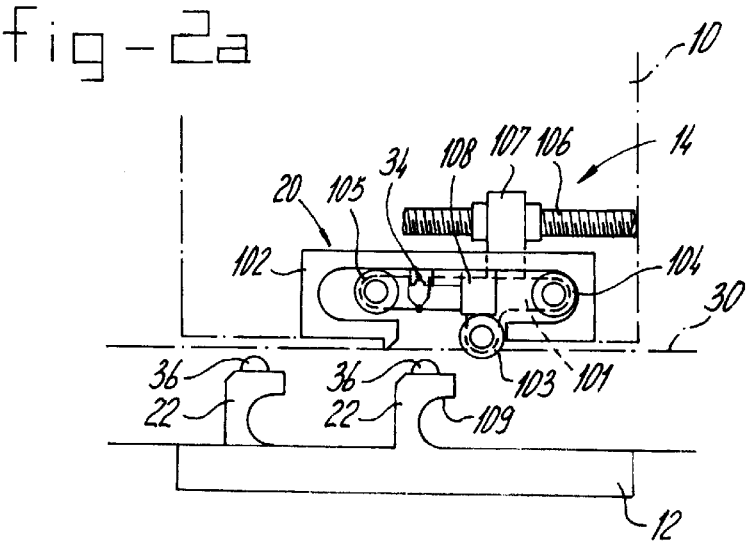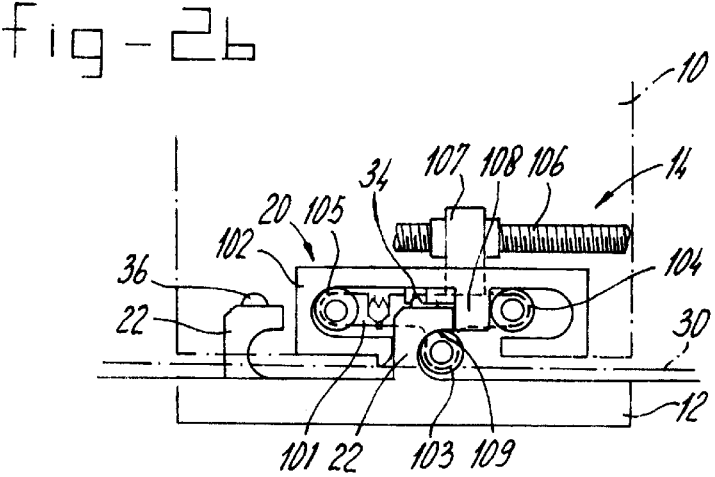

ROBOTICALLY DRIVABLE INTERFACE MECHANISM

The present invention relates to a robotically drivable interface mechanism to couple a payload to a device and to couple a robot arm to the payload, enabling handling of the payload by means of the robot arm.

More specifically, the invention relates to a robotically drivable interface mechanism handling payloads on devices, such as platforms, in space applications also known as on-orbit servicing of payloads. The handling of payloads may include the uncoupling of a payload from the device, the movement of the payload from one place on a device to another, the recoupling of the payload to the device, or manipulation of payload subsystems, e.g. samples, optical units or dust capture panels.

Such a robotically drivable interface is known, for example, from "End effector for on-orbit servicing of payloads" by B. C. Braam and R. Ramaker, Proceedings Sixth European Space Mechanics & Tribology Symposium, Zürich, Switzerland, Oct. 4–6 1995. This article describes various aspects of the handling of payloads on a space platform by a robot arm, and more specifically the handling of payloads on the External Viewing Platform with a robot arm provided with an end effector to couple the robot arm to a payload.

The end effector attached to the end of the robot arm is manipulated by the robot arm, until it is within the required guiding range. Then, with the help of guiding aids, the end effector is guided to a 'connection ready' position and, ultimately, the end effector couples to the payload and the required handling of the payload can start. In the end effector design according to this article, three distinct functions are envisaged, i.e. the guiding, positioning and latching function.

The guiding and positioning function is performed by a so-called kinematic clamp, consisting of three V-grooves on the end effector and three semispheres on the payload to be manipulated. The three semispheres provide six contact points (two in each V-groove), thereby providing fixture of the position of the end effector with respect to the payload in three translational and three rotational axes. A pretension force is necessary to maintain the realized position. This pretension force is provided by a controllable electromagnet in the end effector and a permanent magnet positioned on the payload. To ensure safe operation, the controllable electromagnet is arranged not to exert a force on the permanent magnet when powered and to exert a force on the permanent magnet when not powered.

The known end effector is further provided with latching means, arranged as hooks to couple the end effector with a grapple fixture on the payload. These hooks are provided with a safety mechanism to ensure the coupling stays intact under all circumstances.

For payload servicing in space applications, a number of requirements exist regarding the interfaces between the platform and the payload, respectively between the payload and the end effector of a robot arm, enabling the exchange of payloads and payload subsystems, deployment of equipment and operation of instruments. As the payload is usually attached to the platform during launch, the interface between them has to withstand the forces (caused by acceleration and vibration) during launch. Studies have indicated that two combined aspects have a main influence on the design of the necessary interfaces, i.e. the launch loads and the end effector capabilities.

In most cases, the interface between the platform and the payload is also in place during launch, therefore, this interface has to be able to withstand high launch loads (>3000 N), necessitating high holding forces on the interface mechanism. To be able to exert these holding forces, the end effector would have to be provided with gripping tools that are either very complex or have a high volume and mass. For space applications, it is necessary that all elements are as light as possible, to save on material and launch costs. Finally, also requirements can exist with regard to lifetime of components and assemblies, as no or little possibilities exist to repair these items in space.

Therefore, it is the object of the present invention to provide a robotically drivable interface mechanism being attachable to a payload for coupling the payload to a device and being attachable to an end effector attached to the end of a robot arm for coupling the robot arm with the payload thereby enabling the robot arm to handle the payload, which has a simple design, low weight and volume and a long lifetime.

This object is achieved by the robotically drivable interface mechanism according to a first embodiment. By providing the first coupling means on the interface mechanism as at least one roller cooperating with the second coupling means formed by at least one slot in the device, an effective coupling mechanism results that is compact and able to withstand high launch loads. The roller may be a rotatable wheel mounted in a bearing, or a fixed round body able to move in the slot in the device with low friction. Preferably, the first roller is spring mounted, providing a pretensioned coupling between the interface mechanism and the device. Because of the compactness, the interface mechanism is easy to assemble, and can weigh less while maintaining the requirements with respect to launch loads, etc.

In a second aspect, the present invention relates to an interface mechanism according to another embodiment.

This embodiment of the interface mechanism is able to withstand the high launch loads that occur between the device and the payload. The interface mechanism according to the present invention is equipped with a screw spindle and nut assembly to move the roller frame from a first position in rest to a second position. This has the advantage that less force is needed to couple the interface mechanism to the device ($\pm 1$ N/m$^2$) compared to earlier coupling mechanisms, often requiring a force of 20–25 N/M$^2$. Furthermore, this embodiment also provides an effective latch function for the first and second coupling means, as a relatively large force is needed to move the roller frame coupled to the screw spindle by the nut.

In a preferred embodiment of the present invention, an interface mechanism is provided according to another embodiment. The second and third rollers allow a reliable movement of the roller frame with respect to the roller runway for allowing the first roller to engage an inner surface of associated second coupling means on the device to couple firmly with the device.

In a third aspect, the present invention relates to an interface mechanism according to a further embodiment. This embodiment shows the same advantages as the embodiment mentioned above. In addition, the fact that the pretension between the interface mechanism and the device is slowly built up by the sloped surface has the advantage, that the first guidance means and associated second guidance means don't have to be precisely aligned, as the pretension force will tend to draw them into the precise position.

A further preferred embodiment of the interface mechanism is also described. By providing at least one spring mechanism in the assembly of roller frame and roller runway, a pretension force is exerted between the interface mechanism and the device when the roller frame is moved from the first position to the second position. This pretension force will allow the combination of interface mechanism and device to withstand higher loads, e.g. during launch. The spring may be provided in the mounting of the first roller to the roller frame, or alternatively by mounting the roller runway to the interface mechanism by means of a spring blade.

A further aspect of the present invention relates to a system comprising an interface mechanism according to the embodiments of the invention and a device being arranged for coupling to the interface mechanism. The first and second guidance means allow the interface mechanism and device to be guided to a well defined position with respect to each other.

A comparable arrangement can be defined for a system comprising an interface mechanism according to the preferred embodiments of the invention and an end effector being arranged for coupling to the interface mechanism. Again, the third and fourth guidance means allow the interface mechanism and end effector to be guided to a well defined position with respect to each other.

Preferably, the protrusions in the system according to certain embodiments are arranged as semispheres.

In a further aspect, the present invention relates to an end effecter for cooperating with the robotically drivable interface mechanism of the present invention. This end effector comprises latching means to latch the end effector to the interface mechanism for providing a fail-safe connection of the end effector and the interface mechanism. Preferably, the latching means are driven by a gear motor included in the end effector.

In a still further aspect of the present invention, the present invention relates to another embodiment with an end effector. In this embodiment, the coupling means are provided as a rotatable hook included on the end effector, engaging complementary coupling means on the interface mechanism, e.g. a hook or a ring. Preferably, this embodiment is also provided with latching means.

In general, these embodiments of the end effector exhibit the same advantages as the embodiments of the interface mechanism described above, i.e. the end effectors are easy to assemble, can be compact and light, and exhibit a long durability.

Still further, aspects of the present invention concern a payload provided with an interface mechanism according to the present invention, allowing the payload to be coupled with the device, e.g. a space platform. This invention also relates to an assembly of an interface mechanism and an end effector. In a further aspect, the invention relates to a robot comprising a robot interface, a robot arm and an end effector. The invention also relates to an assembly of the robot and an interface mechanism.

The invention also relates to a device for coupling with the interface mechanism, comprising an inner surface for coupling with the first roller of the interface mechanism. In a preferred embodiment of this device, the inner surface is sloped in order to increase the pretension force between the device and the interface mechanism.

The embodiments of the interface mechanism according to the present invention provide a robotically drivable interface mechanism for uncoupling a payload from a device, moving a payload from one place on a device to another, and coupling the payload to the device by using a robot arm with the end effector according to the present invention attached to it. The interface mechanism is constructed to be able to withstand high launch loads, while the interface mechanism/ end effector assembly is easy to assemble, compact, light and with a long lifetime expectancy. This makes the interface mechanism/end effector very well suited for space applications.

Although the invention is described with reference to space applications, the robotically drivable interface according to the present invention can be used wherever specific requirements exist with respect to loading/ holding force, volume, weight and/or lifetime, e.g. in underwater marine applications or in applications in nuclear facilities.

BRIEF DESCRIPTION OF THE DRAWINGS

The present invention will now be described in more detail referring to a number of preferred embodiments of the robotically drivable interface mechanism according to the present invention, with reference to the accompanying drawings, in which FIG. 1 is a schematic side view of a platform with a payload coupled to it by an interface mechanism according to the present invention and with a robot arm to couple with and handle the payload by an end effector according to the present invention;

FIG. 2a shows a schematic side view of an embodiment of an interface mechanism according to the present invention;

FIG. 2b shows a schematic side view of the embodiment of FIG. 2a when it is coupled to the platform;

FIG. 5b shows a schematic side view of the alternative embodiment of FIG. 5a;

DESCRIPTION OF THE PREFERRED EMBODIMENTS

Figure 3A:
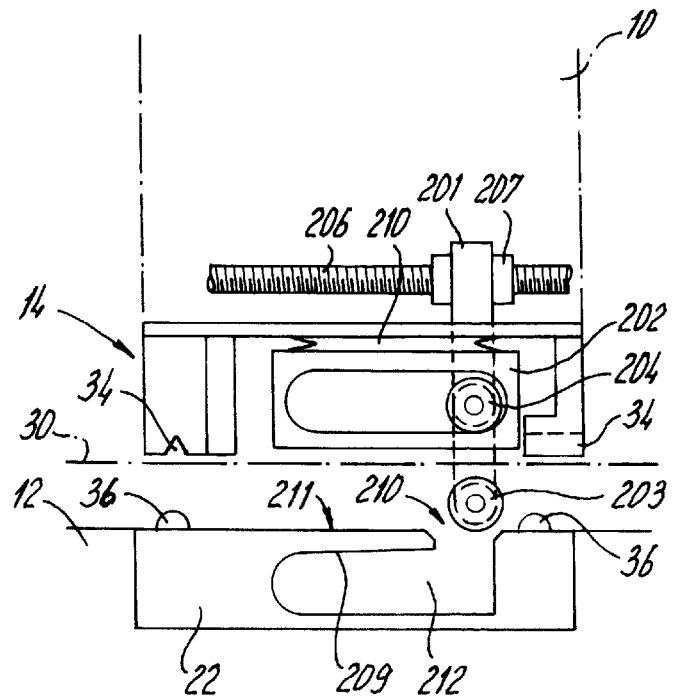
FIG. 3a shows a schematic side view of an alternative embodiment of an interface mechanism according to the present invention.

The present invention relates to an interface mechanism 14 for coupling to a device 12 and for coupling to an end effector 16 attachable to the end of a robot arm 18. The device 12 may e.g. be a module of a space station, or more generally a platform 12. In the following description of the drawings, the term platform 12 will be used to indicate the device onto which the interface mechanism 14 can be coupled.

FIG. 1 shows a typical arrangement of a payload 10 attached to a platform 12 by means of an interface mechanism 14. The interface mechanism 14 is preferably part of and/or integrated with the payload 10. The interface mechanism 14 is coupled to the platform 12 by first coupling means 20 on the interface mechanism 14 and associated second coupling means 22 on the platform 12. An end effector 16 is attached to the end of a robot arm 18 which in turn is attached to the platform 12 and controlled by means of the robot interface 28. The end effector 16 can be coupled to the interface mechanism 14 by third coupling means 24 on the interface mechanism 14 and associated fourth coupling means 26 on the end effector 16.

Furthermore, the end effector 16 is provided with actuator means 42 which can actuate the first coupling means 20 in the interface mechanism 14 when the end effector 16 is coupled to the interface mechanism 14. By making the first coupling means 20 accessible to actuator means 42 in the end effector 16 that is attached to the robot arm 18, a very compact mechanism results that enables the handling of payloads 10 on a platform 12 by using the robot arm 18. Because of the compactness, the interface mechanism 14 and end effector 16 are easy to assemble, and can weigh less while maintaining the requirements with respect to launch loads, etc.

When the end effector 16 is coupled to the interface mechanism 14, the robot interface 28 controls the robot arm 18, e.g. to move the payload 10 and interface mechanism 14 to another place on the platform 12. Rough guidance can be provided by guiding means that are known to the person skilled in the art of robot control, such as cameras and guiding marks on the platform 12. For fine guidance and precise positioning of the payload 10 and interface mechanism 14 with respect to the platform 12, the interface mechanism 14 is provided with first guidance means 34 and the platform 12 is provided with associated second guidance means 36.

Similarly, the interface mechanism 14 is provided with third guidance means 38 and the end effector 16 is provided with associated fourth guidance means 40 to precisely guide and position the end effector 16 with respect to the interface mechanism 14.

Preferably, the first and associated second, respectively, the third and associated fourth guidance means 34, 36; 38, 40 are provided as a set of three V-grooves 34; 40 and three associated protrusions 36; 38. In a preferred embodiment, the three V-grooves 34 define a first coupling plane 30, which is parallel to the plane formed by the three associated protrusions 36 and, for example, parallel to the outer surface of the platform 12. A similar definition can be given of a second coupling plane 32 between the interface mechanism 14 and the end effector 16 as the plane formed by the three V-grooves 40 (or by the three associated protrusions 38). The V-grooves 34; 40 are positioned with three mutually different orientations. The protrusions 36; 38 are shaped in such a way, that each V-groove 34; 40 and associated protrusion 36; 38 form at least two contact points when the V-groove 34; 40 and associated protrusion 36; 38 are in contact. Thereby, the position of the interface mechanism 14 with respect to the platform 12, respectively the end effector 16 is secured in three longitudinal axes and three rotational axes. Also, the V-grooves 34; 40 and the associated protrusions 36; 38 provide a guidance function when they approach each other but are not precisely aligned. A specific example of a form of the protrusion 36; 38 is a ball shaped protrusion, as indicated in the accompanying drawings. The orientation of the V-grooves 34; 40 is described below with reference to FIG. 4b. It will be clear to the person skilled in the art that the V-grooves 34; 40 and the associated protrusions 36, 38 can also define differently oriented planes, which may be oriented parallel to outer walls of the platform 12, respectively payload 10 or not.

In the following description and the referred drawings, reference numerals previously identified are used for the same elements wherever possible.

FIG. 2a shows a cross sectional view of an embodiment of an interface mechanism 14 according to the present invention. The interface mechanism 14 is preferably integrated in the payload 10 and comprises a roller runway 102, securely attached to the payload 10, provided with an opening at the coupling side of the interface mechanism 14. The interface mechanism 14 further comprises a roller frame 101 with a first roller 103 attached to the roller frame 101 by a pretensioned spring and extending into the opening of the roller runway 102. The roller frame 101 further comprises a second roller 104 and a third roller 105 attached to the ends of the roller frame 101. The second and third rollers 104, 105 are guided by the roller runway 102 in a direction parallel to the first coupling surface 30. In a first position, the first roller 103 of the roller frame 101 is pulled against a block 108 of the roller runway 102 that extends towards the opening of the roller runway 102. The interface mechanism 14 further comprises a nut 107 attached to the roller frame 101, cooperating with a screw spindle 106. The assembly of nut 107 and screw spindle 106 translates a rotational movement of the screw spindle 106 into a movement of the roller frame 101. This enables movement of the roller frame 101 by exerting only limited rotational forces on the screw spindle, e.g. by the actuator means 42 of the end effector 16. Secondly, by maintaining the screw spindle 106 in a fixed position, the roller frame 101 is also substantially fixed in position, providing a latch mechanism. The use of the screw spindle 106 and nut 107 has the advantage that less force is needed to couple the interface mechanism 14 and payload 10 assembly to the platform 12 ($\pm 1$ N/m$^2$) compared to earlier coupling mechanisms, often requiring a force of 20–25 N/m$^2$.

The interface means 14 are guided and positioned to a precise position with respect to three hooks 22 on the platform, each provided with second guidance means 36 in the form of a semisphere shaped protrusion. Each semisphere 36 contacts associated first guidance means 34 in the form of a V-groove 34 on the interface mechanism 14 for guidance and positioning. In the embodiment shown, an assembly of roller frame 101, roller runway 102 and first, second and third rollers 103, 104, 105, is provided for each hook 22 on the platform. The three roller frames 101 in this embodiment are interconnected for allowing the coupling mechanism to be driven by one set of screw spindle 106 and nut 107.

Once the interface mechanism 14 is in the precise position, as is shown in FIG. 2b, the interface mechanism 14 can be coupled to the platform 12. The hooks 22 on the platform are formed to exactly fit in the opening of the roller runway 102 and to contact the block 108. Furthermore, the hook 22 is formed in such a way, that in this position, its inside surface 109 is precisely aligned with the outer surface of block 108 on the roller runway 102. In this position, the roller frame 101 can easily be moved from its first position to a second position, thereby effectively coupling and latching the interface mechanism 14 to the platform 12. Because the surface of block 108 and the inner surface 109 of hook 22 are precisely aligned, the pretension on the first roller 103 is maintained pretensioned spring pulling the first roller 103 against block 108, pulls the first roller 103 against the inner surface 109 of hook 22 in the second position, causing a positive force between the interface mechanism 14 and the platform 12, thereby ascertaining that the whole assembly can better withstand launch forces.

The interface mechanism 14 can be uncoupled from the platform 12 by moving the roller frame 101 back to its first position.

FIG. 3a shows a second embodiment of an interface mechanism according to the present invention. Where appropriate, elements with comparable function as in the interface mechanism 14 of FIGS. 2a and 2b are indicated by the corresponding reference numerals in the 200 region.

The interface mechanism 14 comprises a roller runway 202, being attached to the interface mechanism 14 by means of a spring blade 210, enabling the roller runway to move in a direction towards the platform 12 to which the interface mechanism 14 may be coupled. The interface mechanism 14 comprises a roller frame 201 with a first roller 203 attached to a first end of the roller frame 201, the first end extending outwardly from the interface mechanism 14, and a second roller 204 attached to the roller frame 201. The second roller 204 is positioned in the roller runway 202, thereby guiding the roller frame 201 in a direction substantially perpendicular to the roller frame 201.

As in the embodiment described with reference to FIGS. 2a and 2b, the interface means 14 are guided and positioned to a precise position with respect to three semispheres 36 on the platform 12. Each semisphere 36 contacts an associated V-groove 34 on the interface mechanism 14 for guidance and positioning.

The platform 12 is provided with second coupling means 22, in the form of a recession 212 in the outer surface of the platform 12. Part of the recession 212 is covered by an elongated section 211, leaving an opening 210 into which the first roller 203 can be inserted when the roller frame 201 is in the first position.

The interface mechanism 14 also comprises a nut 207 attached to the roller frame 201, cooperating with a screw spindle 206. The assembly of nut 207 and screw spindle 206 translates a rotational movement of the screw spindle 206 into a movement of the roller frame 201. This enables movement of the roller frame 201 by exerting only limited rotational forces on the screw spindle 206, e.g. by the actuator means 42 of the end effector 16. Secondly, by maintaining the screw spindle 206 in a fixed position, the roller frame 201 is also substantially fixed in position, providing a latch mechanism.

In the embodiment shown, an assembly of roller frame 201, roller runway 202 and first and second rollers 203, 204, is provided for each combination of semisphere 36 and recession 212 on the platform 12. The three roller frames 201 in this embodiment are preferably interconnected for allowing the coupling mechanism to be driven by one set of screw spindle 206 and nut 207.

Figure 3B:
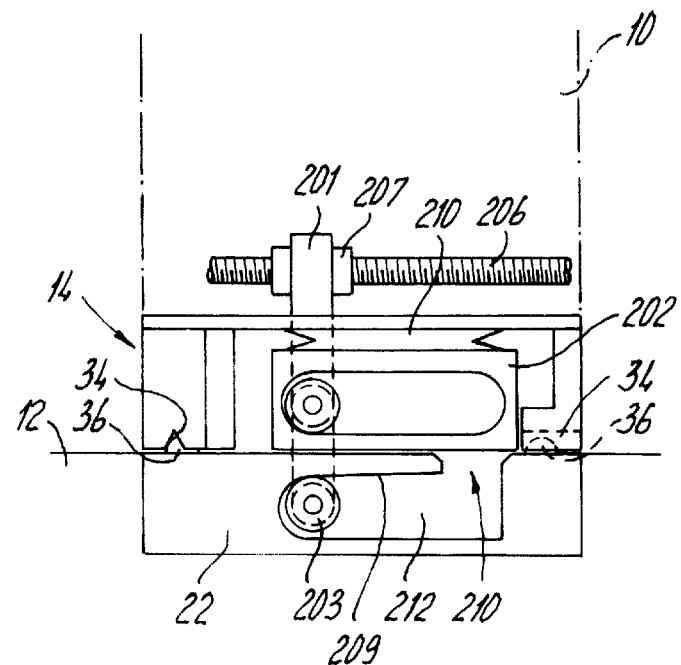
FIG. 3b shows a schematic side view of the alternative embodiment of FIG. 3a when it is coupled to the platform.

Once the interface mechanism 14 is in the precise position as defined by the V-grooves 34 and semispheres 36, as is shown in FIG. 3b, the interface mechanism 14 can be coupled to the payload 12, when the roller frame 201 is in a first position in rest, in which the first roller 203 can engage the recession 212 on the platform 12. The elongated section 211 of the coupling means 22 forms a sloped surface 209, causing the first roller 203 to move slightly parallel to the roller frame 201 when the roller frame 201 is moved to a second position, in which the payload 10 is coupled to the platform 12. The movement from the first position to the second position causes a build up of a pretension between the platform 12 and the interface mechanism 14 by the spring blade 210 resulting in a positive force between the interface mechanism 14 and the platform 12, thereby ascertaining that the whole assembly can better withstand launch forces. The spring blade 210 can be constructed to provide sufficient force with minimum deflection (in the order of 0.1 mm) to ascertain no problems arise in the connection of the screw spindle 206.

As an alternative, the roller runway 202 can be mounted directly to the interface mechanism 14 without the spring blade 210. In that case, the first roller 203 can be mounted to the roller frame 201 by a pretensioned spring providing the desired pretension force between interface mechanism 14 and platform 12 in the coupled position.

The fact that the pretension between the interface mechanism 14 and the platform 12 is slowly built up because of the sloped surface 209 has the advantage, that the first guidance means 34 and associated second guidance means 36 don't have to be precisely aligned, as the pretension force will tend to draw them into the precis( position.

The interface mechanism 14 according to the embodiments shown in FIGS. 2 and 3 provides a mechanical coupling between the platform 12 and the payload 10 and/or between the payload 10 and an end effector 16. Supplementary, the interface mechanism may also provide for an electrical coupling, providing e.g. power supply or signal connections between the platform 12 and payload 10.

Figure 4A:
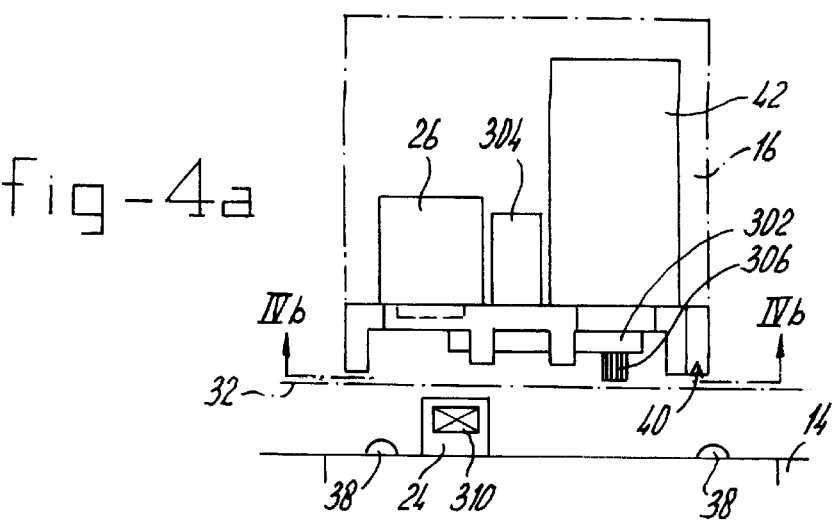
FIG. 4a shows a schematic side view of an embodiment of an end effector according to the present invention.

In FIG. 4a, a schematic side view of an embodiment of an end effector 16 is shown that can be used to couple with the robotically drivable interface mechanism according to the present invention. The end effector 16 is guided and positioned to a precise position with respect to third coupling means 24 on the interface mechanism 14. The interface mechanism 14 is provided with third guidance means 38, preferably in the form of semisphere shaped protrusions. Each semisphere 38 contacts associated fourth guidance means 40 in the form of a V-groove 40 on the end effector 16 for guidance and positioning, comparable to the first and second guidance means on the interface mechanism 14 and platform 12.

The third coupling means 24 are preferably formed as a permanent magnet 24 shielded from the interface mechanism 14. Once the end effector 16 is in its precisely defined position, the fourth coupling means 26, in the form of a controllable electromagnet 26, can exert a magnetic force on the permanent magnet 24 on the interface mechanism 14 to couple the end effector 16 with the interface mechanism 14. Preferably, the controllable electromagnet 26 is fail-safe, i.e. when the power supply to the electromagnet 26 fails, the coupling function will still work. This can be accomplished by fitting the controllable magnet with a permanent magnet in such an arrangement, that the magnetic field towards the permanent magnet 24 can be substantially eliminated by the electromagnet 26.

Although the coupling force between the permanent magnet 24 and the controllable magnet 26 can be chosen to be sufficiently high to enable handling of the payload 10 by the robot arm 18, the end effector 16 is preferably provided with latching means 302 to secure the coupling of the end effector 16 and interface mechanism 14. The latching means 302 can couple with latch guidings 310, e.g. a groove, on the permanent magnet 24 when the end effector 16 is coupled to the interface mechanism 14. The latching means 302 can be moved by a gear motor 304 by means of a gear sprocket 309 and associated gear teeth 308 on the latching means 302.

The end effector 16 according to the present invention further comprises actuator means 42 which are able to drive the screw spindle 106, 206 of the interface mechanism 14 via connector 306 in order to couple or uncouple the interface mechanism 14 to/from the platform 12.

Figure 4B:
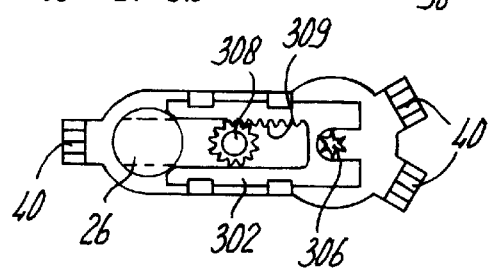
FIG. 4b shows a schematic bottom view of the embodiment of FIG. 4a along the line IVb—IVb.

FIG. 4b shows a bottom view of the end effector 16 of FIG. 4a along the lines IVb—IVb. This view clearly illustrates the orientation of the V-grooves 40. The three V-grooves 40 have three mutually different orientations.

When a V-groove 40 contacts a semisphere shaped protrusion 38, the end effector 16 is guided to a precisely defined position with respect to the interface mechanism 14. The three V-groove/semisphere combinations provide a total of six contact points, enabling fixture in three rotational axes and three longitudinal axes.

Figure 4C:
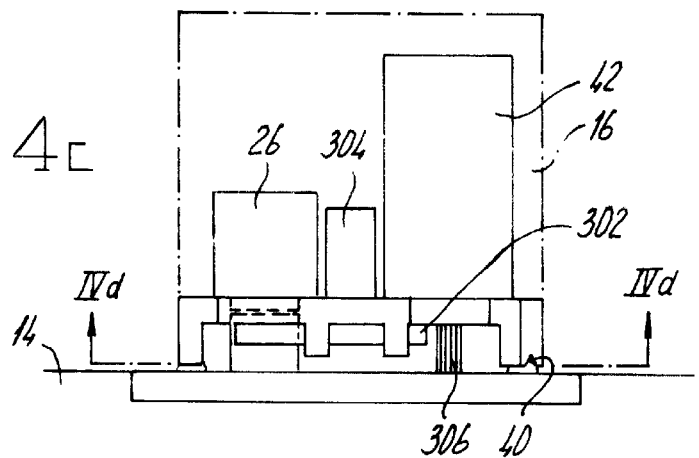
FIG. 4c shows a schematic side view of the embodiment of FIG. 4a, in its coupled position.

In FIG. 4c, the end effector 16 of FIG. 4a is shown coupled to the interface mechanism 14. A pretension force between the end effector 16 and interface mechanism 14 is maintained by the controllable electromagnet 26 and the magnet 24, while the coupling is secured by the latching means 302 and the latch guidings 310.

Figure 4D:
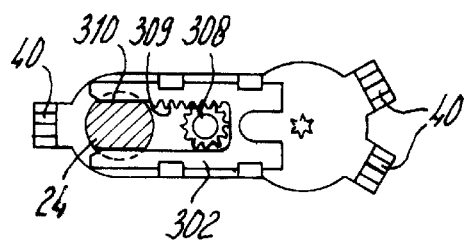
FIG. 4d shows a schematic bottom view of the embodiment of FIG. 4c along the line IVd—IVd.

FIG. 4d shows a bottom view of the end effector 16 of FIG. 4c along the lines IVd—IVd, clearly showing the interaction of latching means 302 and latch guidings 310.

Figure 5A:
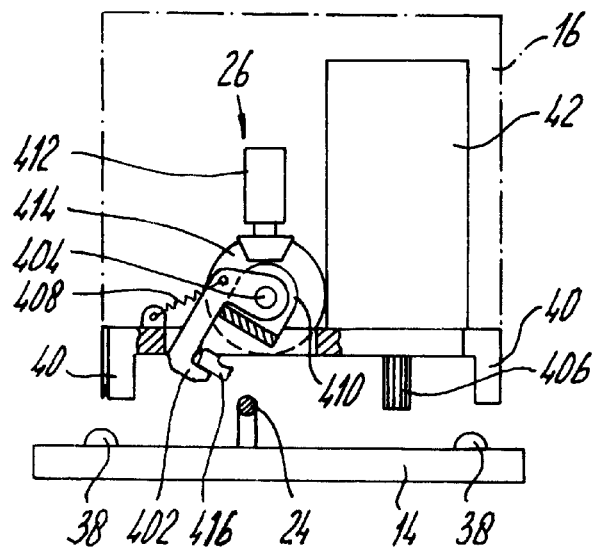
FIG. 5a shows a schematic side view of an alternative embodiment of an end effector according to the present invention.

An alternative embodiment of an end effector 16 according to the present invention is shown schematically in FIG. 5. The general arrangement of the components is identical to the embodiment of the end effector 16 described above, the alternative arrangement of the third and fourth coupling means 24, 26 being the only difference.

Figure 5B:
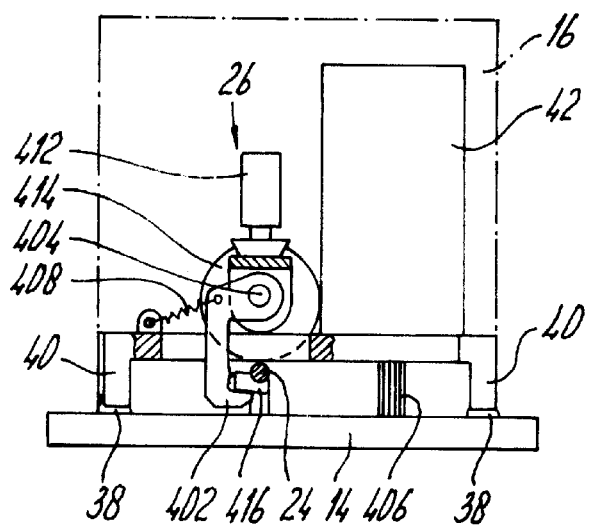

In this alternative embodiment of the end effector 16, the fourth coupling means 26 are formed by a hook 402 provided with a spring element 416, which spring element 416 can couple with loop shaped third coupling means 24 on the interface mechanism 14. The spring element 416 takes care of a pretension between the hook 402 and the loop shaped third coupling means 24. The hook 402 is connected to a shaft 404, around which it can rotate freely. The hook 402 is connected to the fixed part of the end effector 16 by a hook spring 408 for pulling the hook 402 to a second position. The hook 402 is kept in a first position in rest by an eccentric 410. The eccentric 410 is also connected to the shaft 404 and is drivable by a gear motor 412 through a gear 414. When the gear motor 412 drives the gear 414, the eccentric 410 will turn anti clockwise in FIG. 5a, thereby releasing the hook 402. Because of the tension of the spring 408, the hook will advance to its second position, thereby coupling the end effector 16 to the interface mechanism 14, as is shown in FIG. 5b.

The embodiments of the interface mechanism 14 according to the present invention provide a robotically drivable interface mechanism for uncoupling a payload 10 from a platform 12, moving a payload 10 from one place on a platform 12 to another, and coupling the payload 10 to the platform 12 by using a robot arm 18 with the end effector 16 according to the present invention attached to it. The interface mechanism 14 is constructed to be able to withstand high launch loads, while the interface mechanism/end effector assembly 14, 16 is easy to assemble, compact and light. This makes the interface mechanism/end effector assembly 14, 16 well suited for space applications.

What is claimed is:

1. Robotically drivable interface mechanism (14) for coupling to a device (12) and for coupling to an end effector (16) attachable to the end of a robot arm (18), the interface mechanism (14) comprising first coupling means (20) to couple with associated second coupling means (22) on the device (12) and third coupling means (24) to couple with associated fourth coupling means (26) on the end effector (16), the first coupling means (20) being connectable to actuator means (42) included in the end effector (16), when the interface mechanism (14) is coupled to the end effector (16), characterised in that the first coupling means (20) comprise at least one first roller (103; 203) for cooperating with the second coupling means (22) formed by at least one slot (109; 212) in the device (12).

2. Interface mechanism (14) according to claim 1, in which the first roller (103; 203) is spring mounted for providing a pretensioned coupling of the interface mechanism (14) to the device (12).

3. Interface mechanism (14) according to claim 1, further comprising first guidance means (34) to guide and position the interface mechanism (14) with respect to associated second guidance means (36) on the device (12) and third guidance means (38) to guide and position the interface mechanism (14) with respect to associated fourth guidance means (40) on the end effector (16).

4. Interface mechanism (14) according to claim 1, in which the first coupling means (20) further comprise a roller frame (101; 201) and associated roller runway (102; 202), the roller frame (101; 201) being movable in the associated roller runway (102; 202) from a first position in rest to a second position, the first coupling means (20) further comprising a screw spindle (106; 206) that can be connected to the actuator means (42) included in the end effector (16), the screw spindle (106; 206) cooperating with a nut (107; 207) fixedly attached to the roller frame (101; 201) for translating the rotational movement of the screw spindle (106; 206) in a translational movement of the roller frame (101; 201) between the first position and the second position.

5. Interface mechanism (14) according to claim 4, in which the at least one first roller (103) is mounted to the roller frame (101) in between a second and third roller (104, 105) mounted at the outer ends of the roller frame (101), the second and third roller (104, 105) engaging the roller runway (102) for allowing the roller frame (101) to move between the first position and the second position, the first roller (103) being held against a block (108) in the first position, the block (108) being attached to the roller runway (102), and the first roller (103) being arranged for engaging an inner surface (109) of the associated second coupling means (22) on the device (12) in the second position for coupling the interface mechanism (14) to the device (12).

6. Interface mechanism (14) according to claim 4, in which the roller frame (201) further comprises a second roller (204) mounted to the roller frame (201), the second roller (204) engaging the roller runway (202) for allowing the roller frame (201) to be moved between the first position and the second position, the first roller (203) being arranged for engaging a sloped inner surface (209) of the associated second coupling means (22) when the roller frame (201) is moved form the first position to the second position, thereby coupling the interface mechanism (14) to the device (12).

7. Interface mechanism according to claim 4, in which an assembly of roller runway and roller frame is provided with at least one spring for exerting a pretension force between the interface mechanism and the device when the roller frame is moved from the first position to the second position.

8. A system comprising:

an interface mechanism comprising first coupling means to couple with associated second coupling means on a device coupled to the interface mechanism and third coupling means to couple with associated fourth coupling means on an end effector coupled to the interface mechanism, said first coupling means being connected to actuator means included in the end effector when the interface mechanism is coupled to the end effector, wherein the first coupling means comprise at least one first roller for cooperating with the second coupling means formed by at least one slot in the device, said first interface mechanism further comprising first guidance means to guide and position the interface mechanism with respect to associated second guidance means on the device and third guidance means to guide and position the interface mechanism with respect to associated fourth guidance means on the end effector, wherein the first guidance means and associated second guidance means comprise three pairs of a V-groove and an associated protrusion, said V-grooves are positioned with mutually different orientations, for allowing each V-groove and respective associated protrusion to form at least two contact points when the V-groove and associated protrusion are in contact, thereby fixing the position of the interface mechanism with respect to the device in three different coordinate axes and three different rotational axes.

9. The system according to claim 8, wherein the third guidance means and the fourth guidance means comprise three pairs of a V-groove and an associated protrusion, said v-grooves are positioned with mutually different orientations for allowing each V-groove and associated protrusion to form at least two contact points when the V-groove and associated protrusion are in contact, thereby fixing the position of the interface mechanism with respect to the end effector in three different coordinate axes and three different rotational axes.

10. The system according to claim 9 wherein the end effector further comprises latching means to latch the end effector to the interface mechanism by means of a controllable safety latch on the end effector designed to cooperate with a matching groove provided on the third coupling means.

11. The system according to claim 10 further comprising a gear motor to move the safety latch.

12. The system according to claim 8 wherein the protrusions are semispheres.

13. The system according to claim 8 wherein said fourth coupling means further comprises a rotatable hook, the hook being movable from a first position in rest to a second position before engaging the third coupling means on the interface mechanism.

14. The system according to claim 13 wherein the end effector further comprises an eccentric and a spring, the eccentric holding the hook in the first position and the spring forcing the hook in the second position when the eccentric is moved away from the hook.

15. The system according to claim 13, wherein the hook further comprises a spring element for contacting the third coupling means in the second position for exerting a pretension force between the end effector and the interface mechanism.

16. The system according to claim 8 wherein the device comprises an inner surface for coupling with the at least one first roller.

17. The system according to claim 16 wherein the inner surface is sloped in order to increase the pretension force between the device and the interface mechanism.

* * * * *